United States Patent [19]
Luciani et al.

[11] Patent Number: 5,245,748
[45] Date of Patent: Sep. 21, 1993

[54] APPARATUS FOR CONNECTING STATOR COIL LEADS

[75] Inventors: Sabatino Luciani; Antonio Lumini, both of Florence, Italy

[73] Assignee: Axis U.S.A., Inc., Marlborough, Mass.

[21] Appl. No.: 739,291

[22] Filed: Aug. 1, 1991

Related U.S. Application Data

[63] Continuation-in-part of Ser. No. 561,965, Aug. 1, 1990, Pat. No. 5,065,503.

[51] Int. Cl.$^5$ .............................................. B23P 19/00
[52] U.S. Cl. ................................ 29/735; 29/564.5; 29/736
[58] Field of Search .............. 29/33 L, 564.5, 732, 29/733, 734, 735, 736

[56] References Cited

U.S. PATENT DOCUMENTS

| | | | |
|---|---|---|---|
| 2,669,771 | 2/1954 | Burge et al. | 29/205 |
| 3,156,037 | 11/1964 | Warner | 29/205 |
| 3,474,515 | 10/1969 | Dammar | 29/205 |
| 3,675,300 | 7/1972 | Reust et al. | 29/205 C |
| 3,747,187 | 7/1973 | Colwell | 29/203 D |
| 3,812,570 | 5/1974 | Mason | 29/205 D |
| 3,818,570 | 6/1974 | Del Bono | 29/205 C |
| 3,927,456 | 12/1975 | Dammer | 29/205 C |
| 4,000,764 | 1/1977 | Reiger, Jr. | 140/113 |
| 4,074,418 | 2/1978 | Pearsall | 29/596 |
| 4,428,113 | 1/1984 | Fischer et al. | 29/736 |
| 4,553,319 | 11/1985 | Fischer et al. | 29/596 |
| 4,648,176 | 3/1987 | Moser | 29/596 |
| 4,694,560 | 9/1987 | Barrera | 29/564.1 |
| 4,827,601 | 5/1989 | Banner | 29/597 |
| 4,951,379 | 8/1990 | Clemenz | 29/597 |
| 4,974,313 | 12/1990 | Reiger, Jr. | 29/736 |
| 5,090,107 | 2/1992 | Beakes et al. | 29/566.3 |
| 5,090,108 | 2/1992 | Banner et al. | 29/596 |

Primary Examiner—Timothy V. Eley
Assistant Examiner—C. Richard Martin
Attorney, Agent, or Firm—Nicola A. Pisano

[57] ABSTRACT

Methods and apparatus are provided for connecting a lead wire extending from a coil portion wound on a pole of a stator core to one or more terminals mounted on the stator core, wherein the method includes the steps of: grasping a lead wire; disposing the lead wire adjacent at least a first terminal; partially and then fully engaging the lead wire with the terminal; repeating the steps of disposing and engaging the lead wire with later terminals, if any; and then cutting the lead wire. Apparatus is provided for performing the method steps for complex lead wire connection patterns.

14 Claims, 14 Drawing Sheets

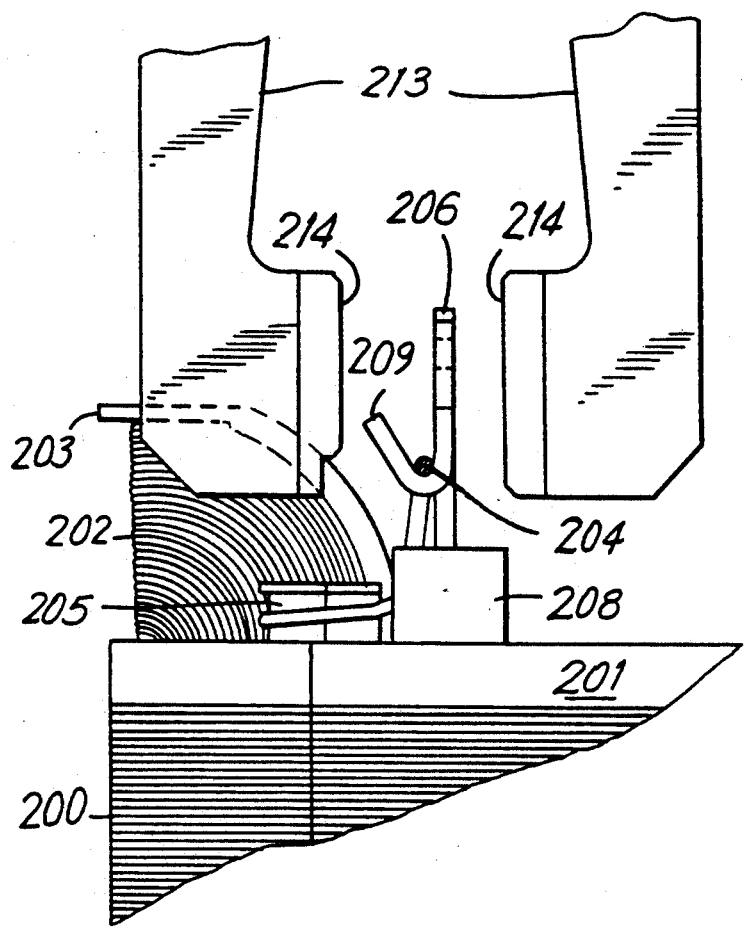
FIG. 14A
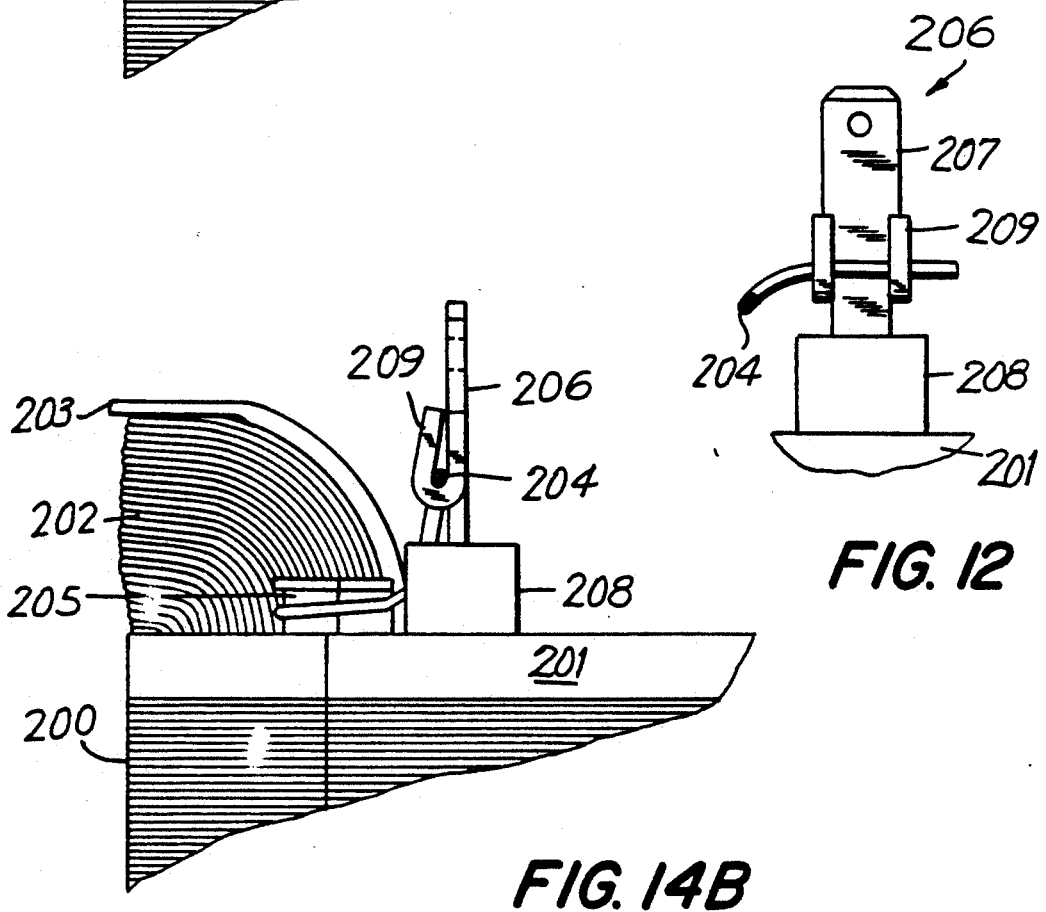
FIG. 12
FIG. 14B

APPARATUS FOR CONNECTING STATOR COIL LEADS

This application is a continuation-in-part of U.S. Pat. application Ser. No. 07/561,965, filed Aug. 1, 1990.

BACKGROUND OF THE INVENTION

This invention relates to methods and apparatus for making stators for electric motors and similar machines such as generators. Although the invention is described in the context of its application to electric motor stators, it will be understood that it is equally applicable to other types of stators wherein stator coil leads are connected to one or more terminal receptacles.

Modern stators often have more than one coil portion wound on each stator pole. The start and finish lead wires extending from these coil portions must be connected to terminals mounted on stator terminal boards, which boards are typically located on the stator end faces. In the stator manufacturing process, the lead wires extending from one or more coil portions wound on each pole of a stator core at the completion of the winding operation are temporarily anchored in grippers located, for instance, on pallets associated with the stator cores. The stator and pallet assemblies are transferred to a separate lead termination station upon leaving the winding station A method and apparatus for accomplishing such temporary lead anchoring is described in copending U.S. Pat. application 07/321,919, filed Mar. 13, 1989.

At the lead termination station, the start and finish lead wires extending from the coil portion leads are connected to the appropriate terminal receptacles located on the stator terminal board. Modern stator designs frequently require that the lead wires be connected to multiple terminals, so that the lead wires follow different paths when routed through the several terminals. For some simple configurations of the terminals on the stator terminal board, the lead wires may be connected to the terminals by simple mechanical devices. However, the need for increasingly complex lead wire connection patterns exceeds the ability of presently known devices to automatically establish these connections.

Previously known devices for performing terminal lead connections, such as those described in Pearsall U.S. Pat. 4,074,418 and Reiger, Jr. U.S. Pat. No. 4,000,764, are typified by the complicated structures required to perform even simple terminal connections. Modification of such previously known machines to enable more complex lead wire connections would be precluded because of the relatively small working area presented by the stator end face.

In view of the foregoing, it is an object of this invention to provide methods and apparatus for automatically connecting temporarily anchored start and finish leads of coil portions to terminals located at various positions and orientations on the stator terminal board.

It is a further object of this invention to provide methods and apparatus for effecting complicated connections of coil portion leads to terminals located on a stator terminal board wherein different wire lead paths are used for the several leads.

It is still a further object of this invention to provide methods and apparatus for effecting complicated connections of coil portion leads to terminals located on a stator terminal board wherein a single wire lead is connected to more than one terminal.

It is another object of this invention to provide a very compact apparatus for effecting complicated connections of coil portion leads to terminals located on a stator terminal board.

It is yet another object of this invention to provide an apparatus for connecting lead wires extending from coil portions to terminals mounted on a stator terminal board where the apparatus can be easily adjusted for use on a variety of stator sizes, stator terminal board shapes and terminal patterns.

SUMMARY OF THE INVENTION

These and other objects of the invention are accomplished in accordance with the principles of the invention by automatically engaging the lead wires extending between the coil portions wound on the stator poles and the temporary lead wire anchors, and moving the lead wires through a predetermined path into engagement with one or more terminals located on the stator terminal board.

The method and apparatus of the present invention is first described with reference to terminals generally having a hollow housing with a slot extending transversely through and axially down opposite walls of the housing, the walls defining a slot which is relatively narrow at the top and tapered to a narrow base, so that a wire inserted transversely in the slot is frictionally engaged. Such terminal connection means are widely known in the field as AMP style terminals. The terminals are mounted on, or constructed as an integral part of, an electrically nonconducting terminal board, which terminal board is mounted on an end face of the stator core. Methods and apparatus for engaging the lead wire with two alternate terminal designs are also described. It is to be understood however, that the scope of the present invention extends to all similar terminal designs.

Once the coil portions have been wound on the stator core and the lead wires temporarily anchored in the associated temporary grippers, the stator and pallet assembly is transferred to the lead termination station, at which station the apparatus of the present invention is situated. The lead wire handling assembly engages a lead wire from a temporary anchor using a hook and rod mechanism wherein a hook portion engages the lead wire and a push rod yieldably bears against the lead wire and inner hook portion. The wire handling assembly is then moved to a position adjacent a terminal receptacle so that the lead wire is oriented with the slot of a terminal and then partially inserted in the slot. An insertion tool, mounted on the wire handling assembly, is actuated to push the lead wire to the base of the slot. A cutting tool, also mounted on the wire handling assembly, is selectively operated to cut the lead wire. Alternatively, the hook and rod mechanism and insertion tool may be repositioned to insert the lead wire in one or more other terminals, as required by the particular lead wire connection pattern for that stator design.

This invention also includes method steps performed in sequence for routing a lead wire through a complex path and engaging it in a single terminal, and for generating multiple connections of a single stator lead wire to a plurality of terminals.

BRIEF DESCRIPTION OF THE DRAWINGS

Further features of the invention, its nature and various advantages will be more apparent from the accompanying drawings and the following detailed description of the preferred embodiments

FIG. 1 is an axial end view of an illustrative embodiment of a stator wherein the lead wires have been connected to the terminals located on the terminal board in accordance with the principles of this invention.

FIG. 12 is a fragmentary elevation view of a hook-style terminal means along the line 12—12 of FIG. 11.

FIGS. 14A and 14B are fragmentary plan views illustrating the operation of the clamping jaws of the wire handling device of the present invention to clamp the hooks of the terminal means into engagement with the lead wire, when viewed along the line 14—14 of FIG. 11.

DETAILED DESCRIPTION OF THE PREFERRED EMBODIMENTS

Figure 1:
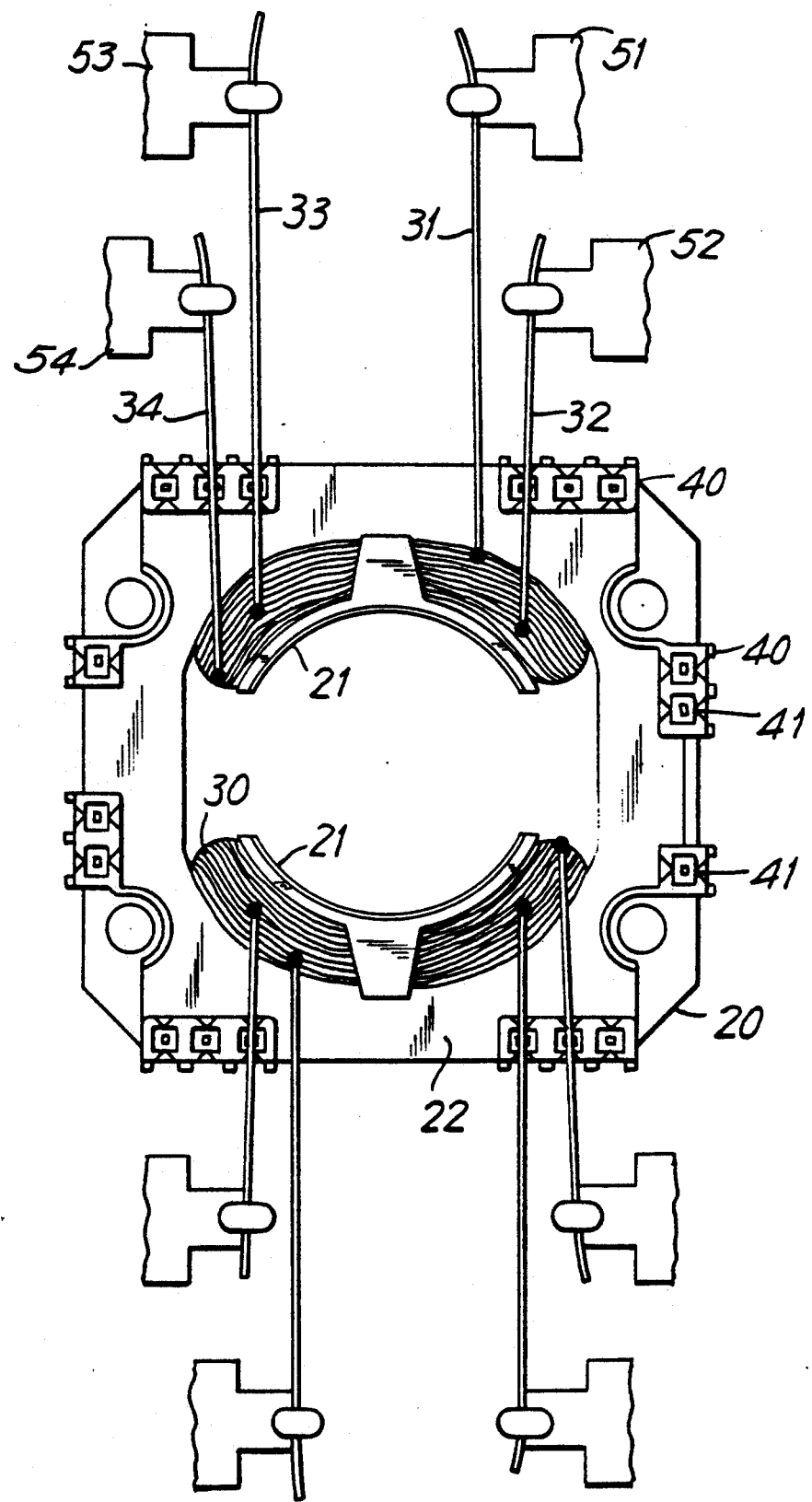
FIG. 1 is an axial end view of a stator and its associated temporary lead wire grippers at the completion of the winding operation.

FIG. 1 shows an axial end view of an illustrative embodiment of a stator 20 wherein the terminal connections are to be effected in accordance with the principles of this invention. Coils of wire 30 are wound on each of the upper and lower poles 21 of the stator 20. An electrically nonconducting terminal board 22 is affixed to each end of the stator core 20, and has a plurality of terminals, generally designated 40, mounted near the outer edge of terminal board 22 at preselected locations. Terminals 40 for use with the wire handling apparatus of the present invention can be of the AMP style. For purposes of illustrating a first embodiment of the present invention, terminals 40 are depicted as AMP style terminals, having slots generally designated 41, aligned perpendicularly to the adjacent terminal board edge.

As illustrated, each coil 30 is comprised of two portions, each portion having a start and finish lead. Accordingly, four leads 31, 32, 33, and 34 extend from coil 30 wound on each stator pole 21. At the completion of the winding of coils 30 at the stator winding station, lead wires 31-34 are temporarily anchored in auxiliary grippers 51, 52, 53, and 54. Auxiliary grippers 51-54 may be mounted either temporarily on stator core 20 or on a pallet associated with stator core 20, or by other means.

Figure 2:
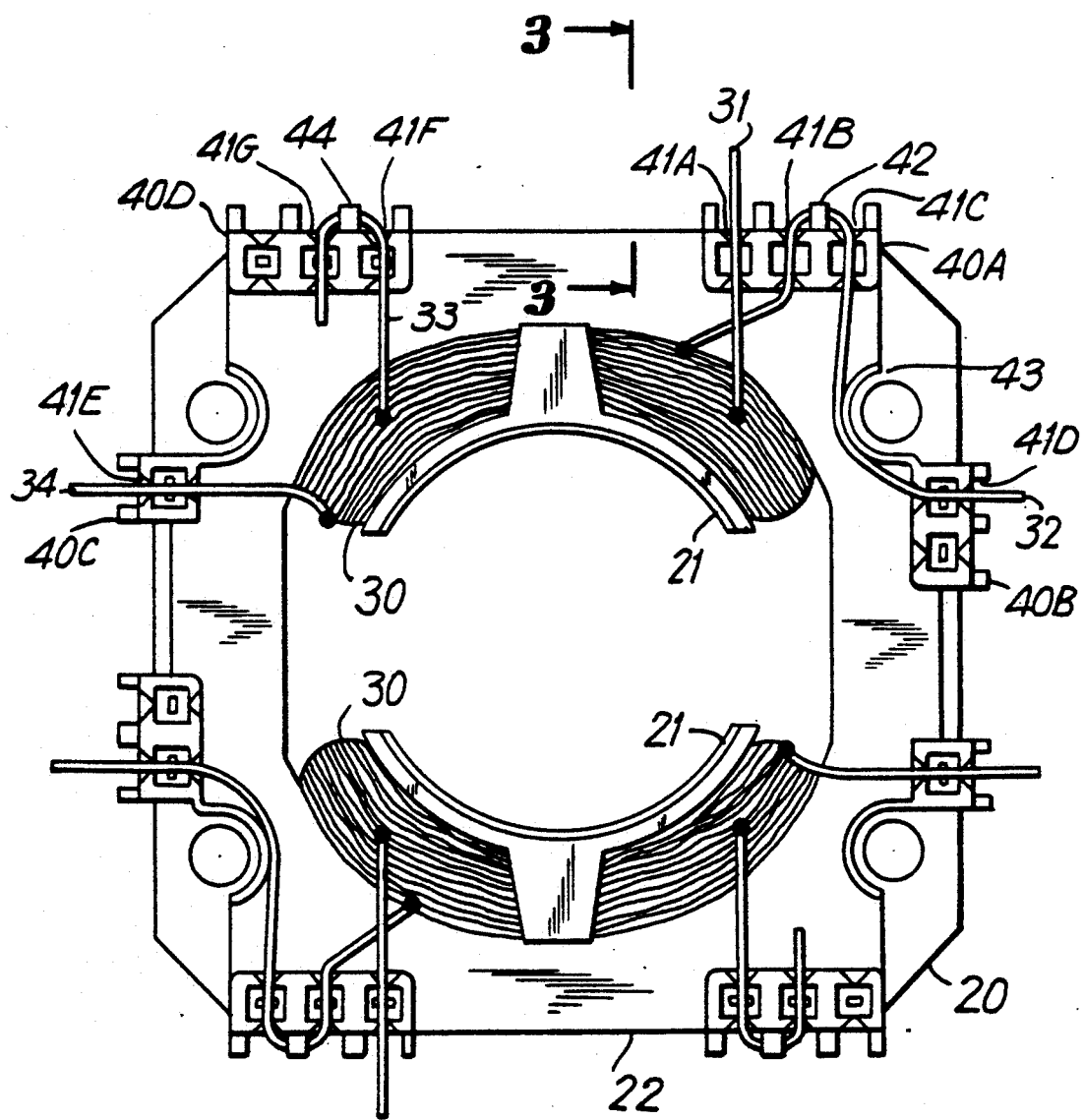

FIG. 2 illustrates one of the many patterns in which multiple coil lead connections to the terminals mounted on the stator terminal board can be obtained using the methods and apparatus of the present invention. For the particular wiring pattern depicted in FIG. 2, lead wire 31 is inserted in slot 41A of terminal group 40A. Lead wire 32 is inserted in slot 41B of terminal group 40A, passes under hook 42, continues uninterrupted through slot 41C, proceeds around ridge 43 and is finally inserted in slot 41D of terminal group 40B. Lead wire 34 is shown as simply engaged in slot 41E of a terminal 40C, while lead wire 33 is inserted into slot 41F, passes under hook 44 and is inserted and cut in slot 41G of terminal group 40D. These lead wire insertion patterns are obtainable using the methods and apparatus hereinafter described.

Figure 3:
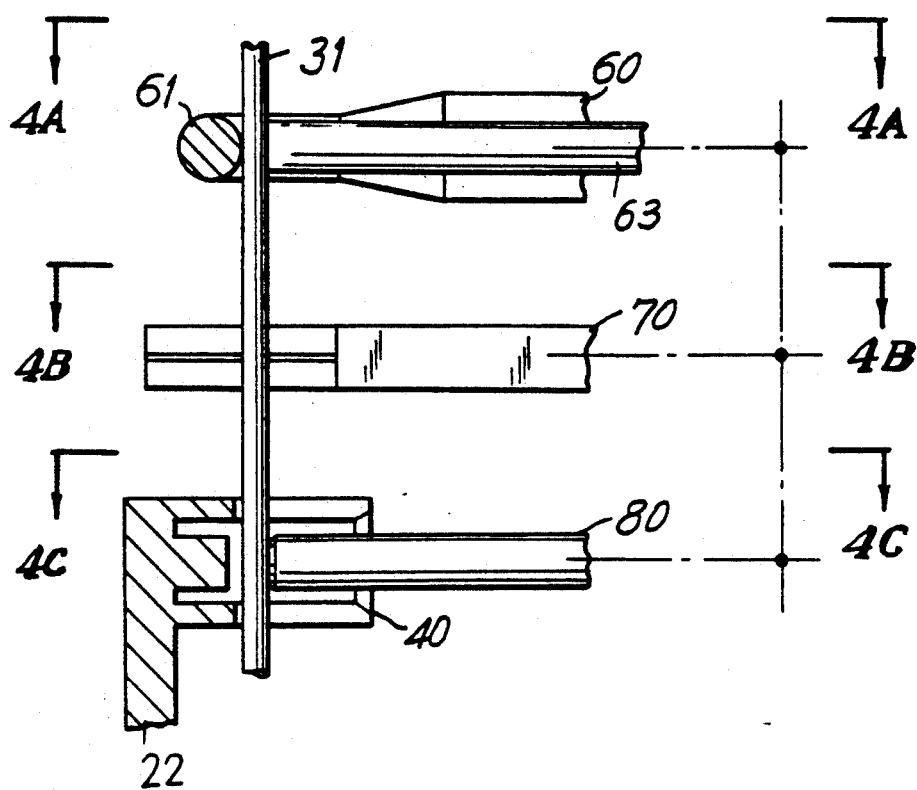
FIGS. 3 illustrates, by fragmentary elevation view, the stator terminal board and wire handling components of the apparatus of the present invention, viewed along the line 3—3 in FIG. 2.

Referring to FIG. 3, three wire handling components of the apparatus of a first embodiment of the present invention are shown positioned adjacent to terminal 40 located on terminal stator board 22, and in engagement with lead wire strand 31, as viewed along line 3—3 of FIG. 2. The uppermost of these components is wire manipulating device 60; lowermost is wire insertion rod 80. Wire cutting device 70 is positioned intermediate wire manipulating device 60 and wire insertion rod 80. All three components are mounted on a common assembly hereafter described.

Figure 4A:
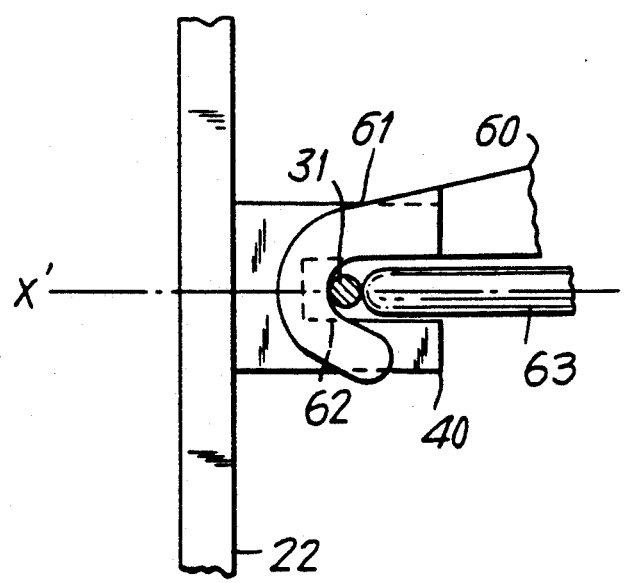
FIG. 4A illustrates by fragmentary plan view the wire manipulating device of the present invention, viewed along line 4A—4A of FIG. 3.

Referring now to FIGS. 3 and 4A, the method of the present invention calls for a first step of grasping lead wire 31 with hook portion 61 of wire manipulating device 60 and removing lead wire 31 from temporary gripper 51 associated with the stator support. Hook portion 61 has groove 62 for grasping lead wire 31 and rod 63 which moves along axis X' of hook 61 to maintain lead 31 inside groove 62. Axis X' passes substantially through the center of wire 31 and lies in a plane parallel to slot 41 of terminal 40 (i.e., substantially perpendicular to stator terminal board 22). Rod 63 urges lead wire 31 against groove 62 with sufficient force to prevent lead wire 31 from slipping out of hook 61, yet permits lead wire 31 to run through hook 61 in a controlled manner. Lead wire 31 is therefore yieldably grasped between hook 61 and rod 63 so that the wire remains taut as the wire handling assembly is moved to connect lead wire 31 to various terminals 40 along the desired path.

In order to obtain complex lead wire connection paths, and to align the lead wire with the terminal slots, it is desirable that wire manipulating device 60 be capable of rotation about its axis X' and translation towards and away from stator terminal board 22. Once lead wire 31 has been aligned by a combination of translation and rotation with terminal slot 41, wire manipulating device 60 is translated along axis X' towards stator terminal board 22 to partially insert lead wire 31 into the outer portion of terminal slot 41. Upon completion of this step, the wire manipulating device will be positioned to one side of the terminal receptacle as shown in FIG. 3.

Figure 4B:
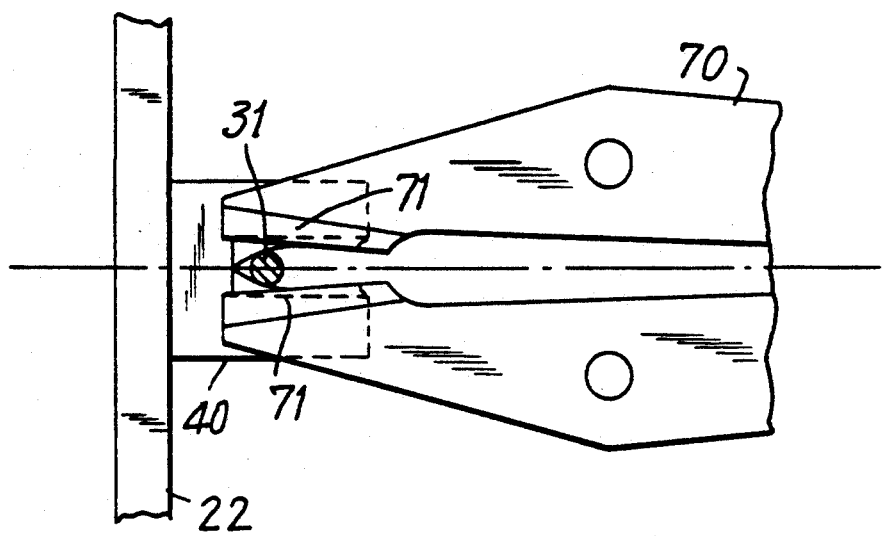
FIG. 4B illustrates by fragmentary plan view the wire cutting device of the present invention, viewed along line 4B—4B of FIG. 3.
Figure 4C:
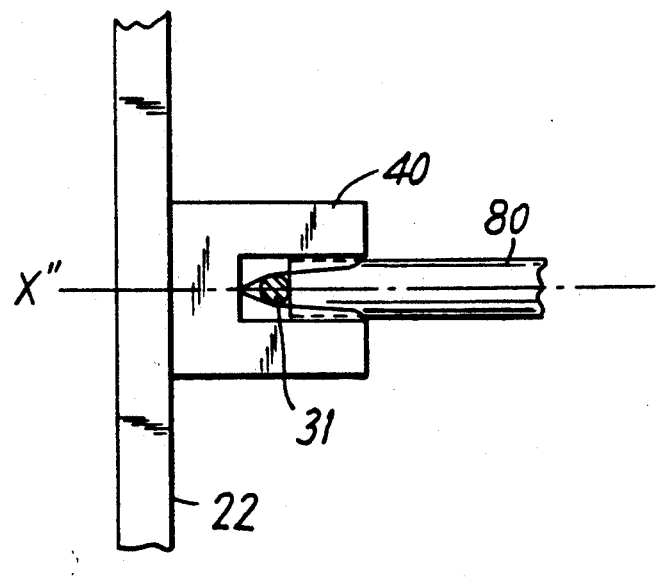
FIG. 4C illustrates by fragmentary plan view the wire insertion rod of the present invention, viewed along line 4C—4C of FIG. 3.

Referring now to FIGS. 3 and 4C, once the wire manipulating device 60 inserts lead wire 31 into the outer portion of terminal slot 41, wire insertion rod 80, which is centered on the terminal receptacle, is translated along its longitudinal axis X" towards terminal receptacle 40. Since lead wire 31 has already been partially inserted in terminal slot 41 by the maneuvering of wire manipulating device 60, extension of wire insertion rod 80 urges lead wire 31 into frictional engagement with the tapered portion at the base of terminal slot 41. Lead wire 31 is thereby engaged with the terminal 40 so that lead wire 31 remains in position when wire insertion rod 80 is withdrawn. Lead wire 31 may be either terminated or wire manipulating device 60 rotated and translated through a preselected path for a predetermined lead wire connection scheme so that the lead wire is partially inserted in the appropriate next terminal slot. The second step of extending wire insertion rod 80 to frictionally engage the lead wire with the tapered portion of terminal 40 is then performed, and the process repeated for subsequent connections as required for the particular predetermined lead wire connection scheme.

When the connection path has been completed by repetition of the above steps, lead wire 31 may be terminated by wire cutting device 70. Referring to FIGS. 3 and 4B, wire cutting device 70 comprises two cutting blades 71 which are swept towards each other on a plane substantially perpendicular to the longitudinal axis of the lead wire. Wire cutting device 70 is positioned between wire manipulating device 60 and wire insertion rod 80, so that the lead wire is held taut on one side of cutting blades 71 by wire manipulating device 60 and on the other side by wire insertion rod 80, which rod remains in contact with the lead wire during the cutting operation.

As shown in FIG. 3, cutting blades 71 are extended to contact the wire lead. When not involved in a cutting operation, blades 71 are retracted in their housing relative to the wire manipulating device 60. The wire lead is cut by a forward translation of the blades 71 towards the stator terminal board, in which the blades remain apart for a first portion of the translation and close upon and cut the lead wire in the final portion of the movement. It is preferable that the lead wire be held substantially parallel to the stator terminal board during the cutting operation. Thus, it is desirable to have wire manipulating device 60 undergo an additional translation towards the stator terminal board so that the lead wire is held substantially perpendicular to the plane of cutting blades 71.

To facilitate the aforementioned steps it is desirable to have wire manipulating device 60, wire insertion rod 80 and wire cutting device 70 positioned in planes parallel to each other and perpendicular to stator terminal board 22. Furthermore, it is desirable that each component 60, 70 and 80, be capable of some translational movement perpendicular to stator terminal board 22 independent of the other components. Thus, for example, once wire manipulating device 60 has positioned the lead wire partially within the terminal slot, wire insertion rod 80 should be capable of extending and retracting motion to urge the wire to the base of the terminal slot while wire manipulating device 60 remains stationary. Likewise, wire insertion rod 80 should be capable of selectively remaining in its extended position when it is desired to actuate wire cutting device 70.

As suggested in FIG. 3, these components are mounted in a single wire handling assembly, which assembly is capable of translational and rotational movement about an axis perpendicular to stator terminal board 22 (along the X axis), as well as movement in the Y and Z planes parallel to stator terminal board 22. To accomplish the complex lead wire terminal connections illustrated in FIG. 2, (i.e, grasp the wire from the anchoring grippers, position the wire along the desired path, and align and insert the wire into a terminal slot) a combination of movements of the wire handling assembly along the X, Y, and Z axes and rotation about the X axis is required. This combination of movements will differ for each of the lead wire connection paths.

Use of wire insertion rod 80 will vary depending upon the type of terminal means to which it is desired to engage the lead wire. For example, as described hereinafter, for the hook-style terminal means of FIG. 12 and the V-shaped terminal means of FIG. 15, wire insertion rod 80 is replaced with a pair of clamping jaws.

Figure 6:
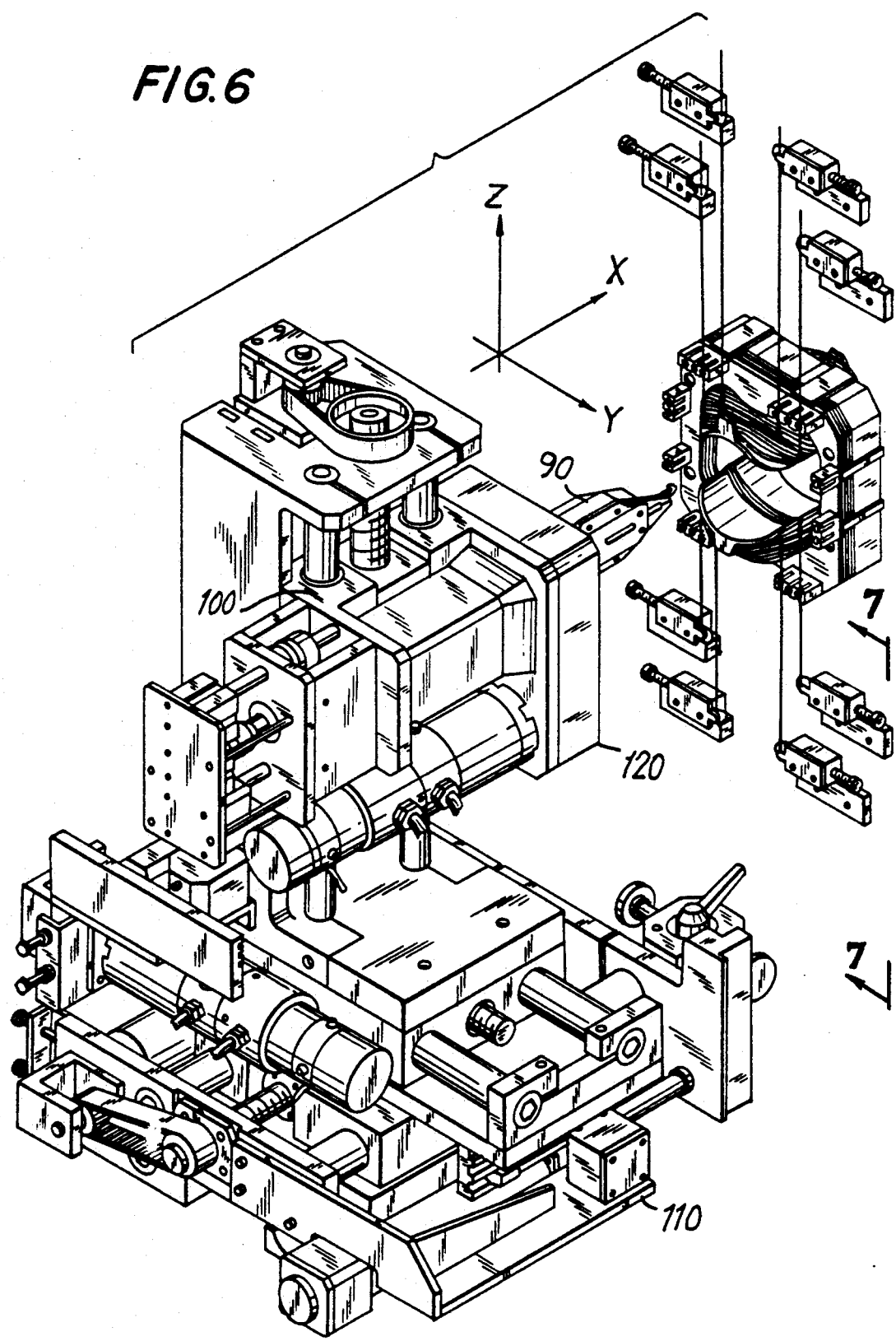
FIG. 6 is a perspective view of the stator coil lead connection device of the present invention mounted on a three-axis platform and showing one working orientation relative to the stator and its associated temporary lead grippers.

FIG. 6 shows a first embodiment of a wire handling assembly 90 constructed in accordance with the principles of this invention. Wire handling assembly 90 is mounted on platform 100 of numerically controlled three-axis mechanism 110 for movement in the X, Y and Z directions relative to the stator core. Wire handling assembly 90 carries wire manipulating device 60, wire cutting device 70 and wire insertion rod 80 and is in turn connected to a gear box 120 which permits rotation of wire handling assembly 90 about the X' axis as described heretofore.

Figure 5A:
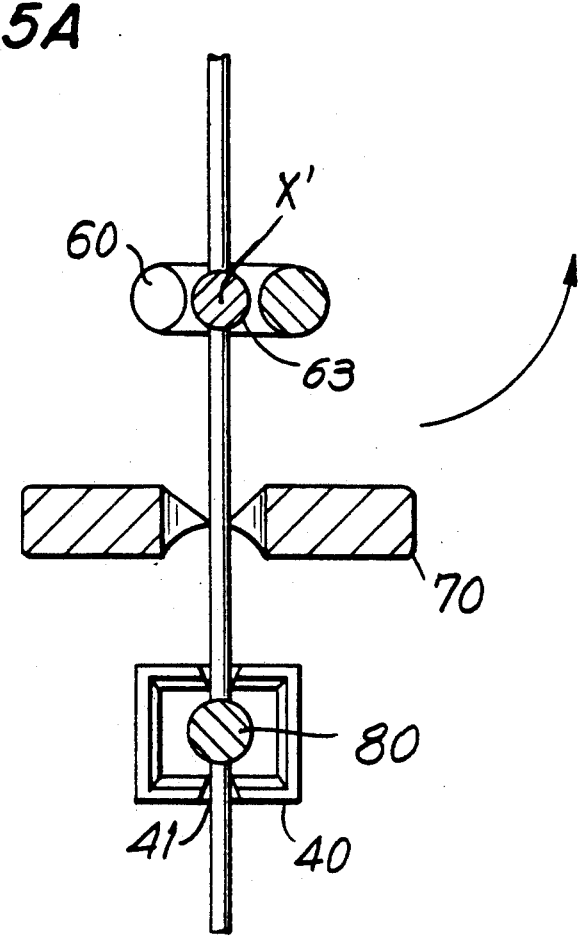
FIGS. 5A and 5B illustrate translation and rotation of the wire handling assembly while moving from a first terminal to a second terminal.
Figure 5B:
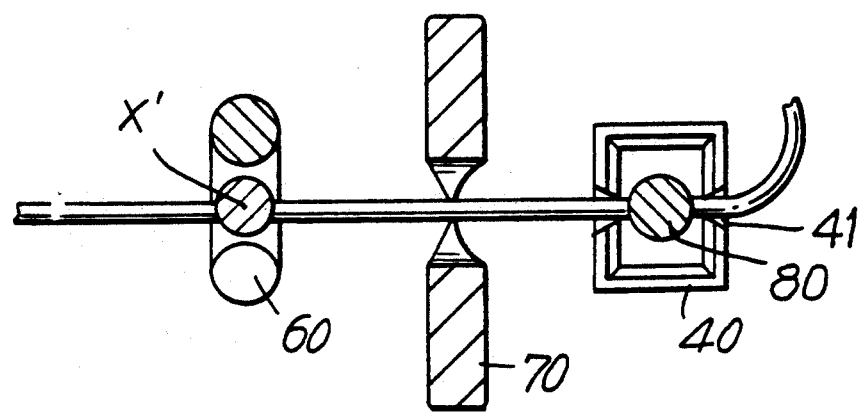

FIGS. 5A and 5B show translation and rotation of wire handling assembly 90 about the X' axis of wire manipulating device 60, as assembly 90 is moved from connecting a lead wire to a first terminal having a horizontally oriented slot 41 to a second terminal having a vertically oriented slot 41. The capability to rotate wire manipulating device 60 about its X' axis permits the lead wire to be aligned with any possible slot orientation. This movement facilitates both grasping the lead wire from the temporary anchoring gripper and disposing the wire along a complicated lead wire connection path, i.e., a path having numerous and substantial changes in the wire direction Furthermore, by positioning cutting blades 70, on the same assembly, between wire manipulating device 70 and wire insertion tool 80, rotation of blades 70 about the X' axis of manipulating device 60 keeps blades 70 in the proper cutting orientation relative to wire manipulating device 60, for all possible orientations of the terminal slots. Likewise, rotation of wire insertion tool 80 about the X' axis of wire manipulating tool 60 maintains the proper orientation of wire insertion tool 80 for all possible terminal slot orientations.

The combination of the three devices 60, 70 and 80 into a single assembly 90 provides the compactness needed to accomplish complicated wire connection paths within the relatively small working area afforded by the stator end face. Apparatus constructed in accordance with the principles of this invention may be used for a variety of stator terminal board sizes and configurations with only a simple reprogramming of its controls.

Figure 7:
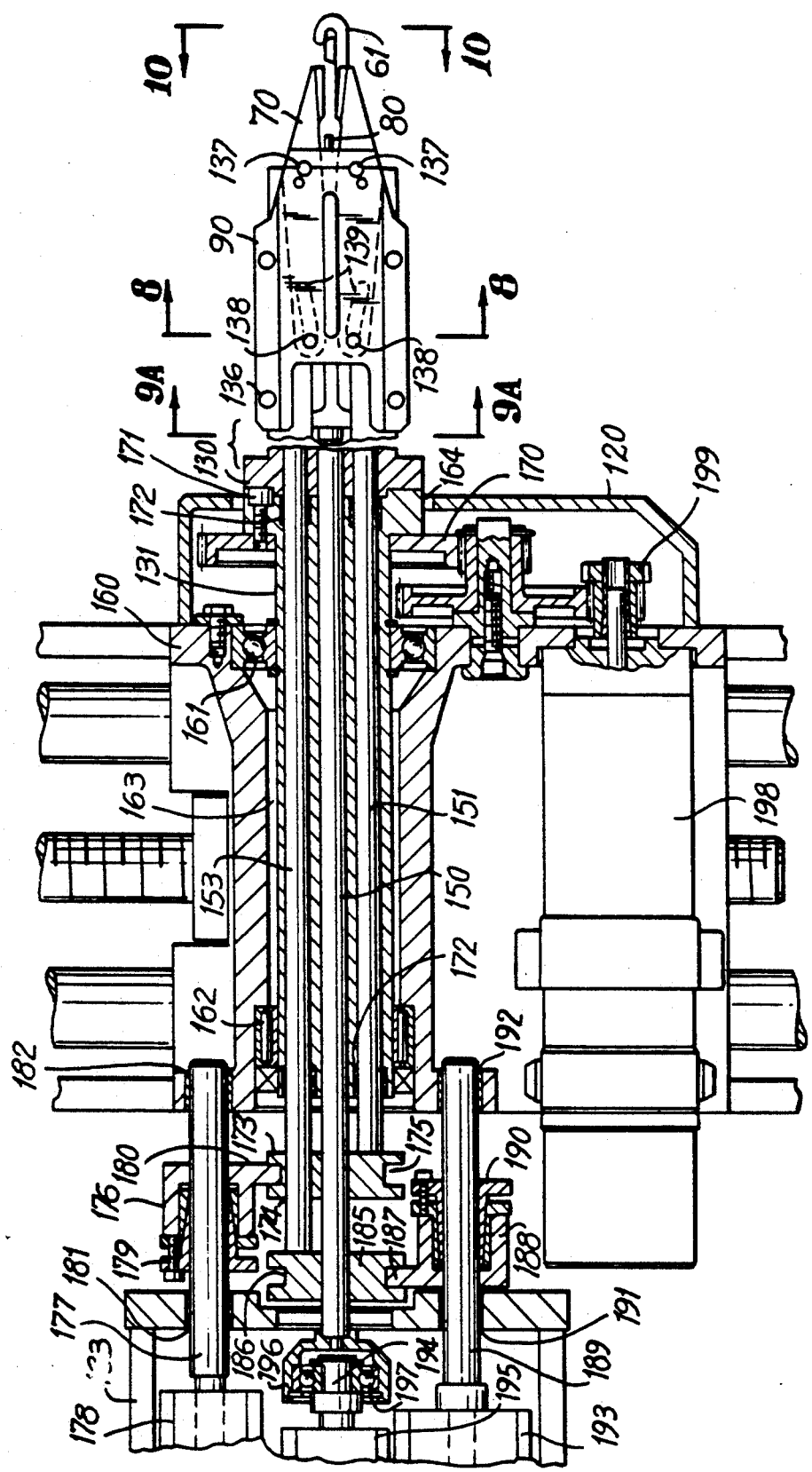
FIG. 7 is a sectional view of the lead connection apparatus similar to that obtainable from view line 7—7 of FIG. 6, except that the mechanism for actuating the wire handling assembly has been rotated through 90 degrees relative to the wire handling assembly.
Figure 8:
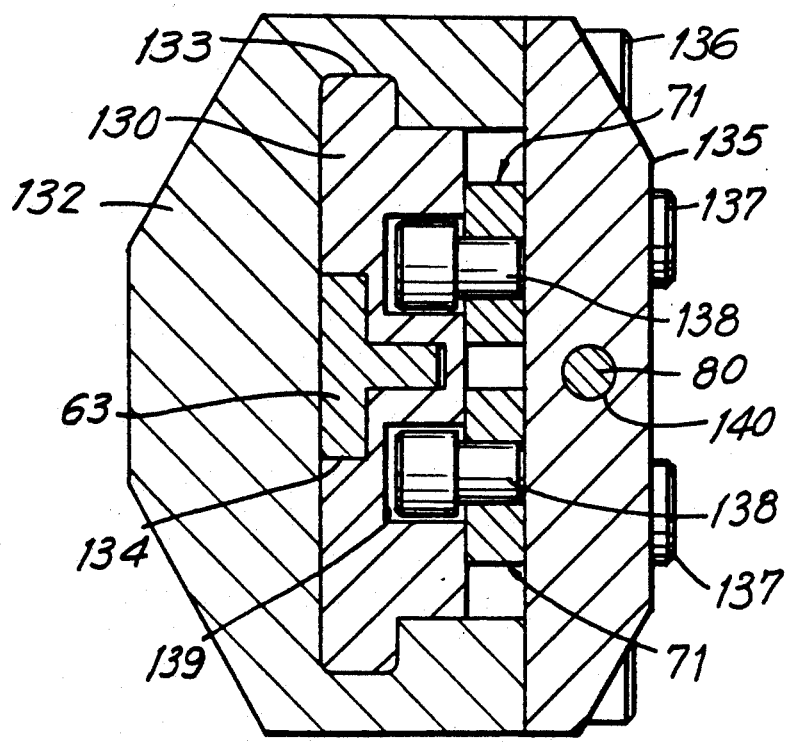
FIG. 8 is a sectional view of wire handling assembly viewed along line 8—8 of FIG. 7.
Figure 10:
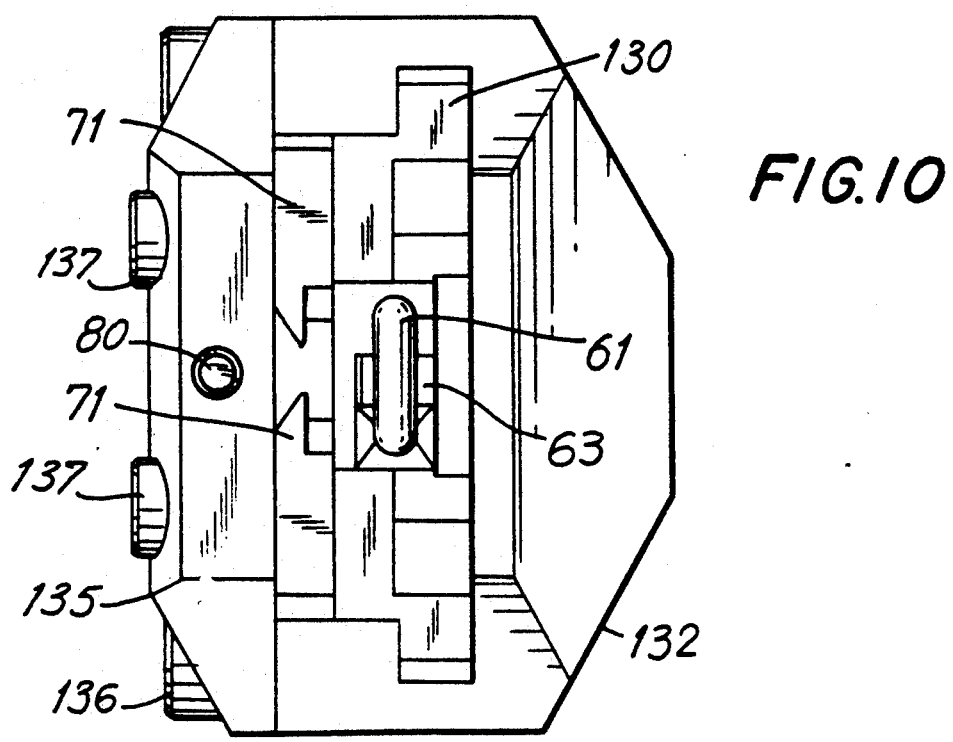
FIG. 10 is a sectional view of wire handling assembly viewed along line 10—10 of FIG. 7.

Referring now to FIGS. 7, 8, and 10, the detail of wire handling assembly 90 and its drive mechanism is described. With regard to the following detailed description, note that in FIG. 7, tube 131 has been rotated 90 degrees relative to wire handling assembly 90, so as to show the internal structure of tube 131. For the orientation of wire handling assembly 90 shown in FIG. 7, actuating rods 150, 151 and 153 actually lie in a single horizontal plane, as shown in FIG. 9A.

Wire handling assembly 90 comprises support member 130 which is flanged to a front end of tube 131 by means of bolts, not shown. Member 132 of FIG. 8, having a C-shaped section, is mounted to slide in the X direction on surface 133 of support member 130. Hook portion 61 is rigidly fixed to support member 130 by bolts or other suitable means, not shown. Wire engaging rod 63 has a T-section portion which is guided in groove 134 of support member 130 for translation in the X direction. Plate 135 is affixed to member 132 with bolts 136. Cutting blades 71 are pivoted on pins 137 which are fixed to plate 135. A pair of guide pins 138 are fixed to cutting blades 71. The ends of guide pins 138 run in slots 139 of support member 130. Wire insertion rod 80 is disposed in bore 140 of plate 135 for translational movement in the X direction.

Figure 9A:
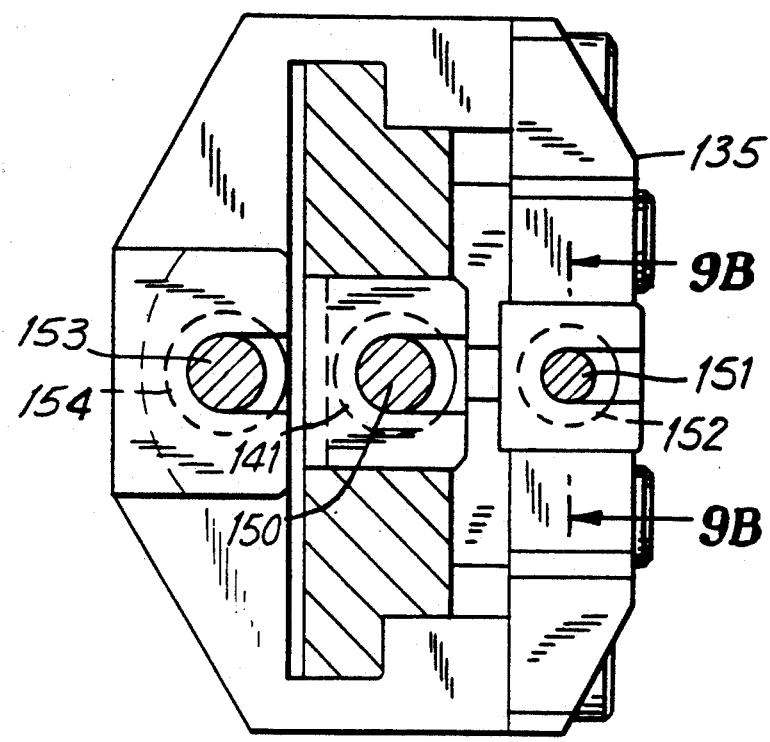
FIG. 9A is a sectional view of wire handling assembly viewed along line 9A—9A of FIG. 7.
Figure 9B:
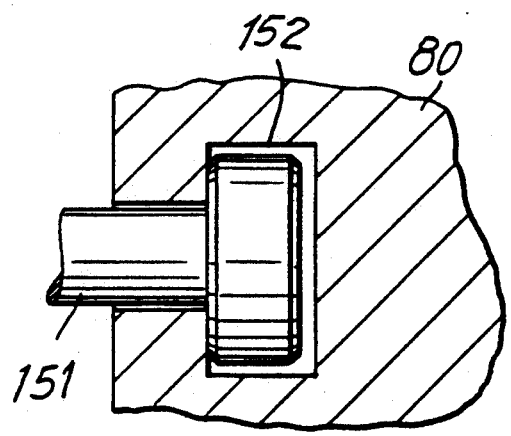
FIG. 9B is a fragmentary sectional view of a push rod connection viewed along line 9B—9B of FIG. 9A.

In FIGS. 7, 9A and 9B, wire engaging rod 63 is shown having an end portion with recess 141 to seat the head of push rod 150. The position of the head of push rod 150 within recess 141 of wire engaging rod 63 is similar to the method by which second push rod 151 is engaged in recess 152 of wire engagement rod 80, shown in detail in FIG. 9B. Selective translation of push rod 150 causes wire engaging rod 63 to either release or hold the lead wire within groove 62 of wire manipulating device 60. Wire insertion rod 80 is in force transmitting contact with a second push rod 151. The head of push rod 151 seats in a recess 152 of wire insertion rod 80 and its selective translation results in the extension and retraction of wire insertion rod 80 required to urge the lead wire into frictional engagement with terminal slot 41 as heretofore described. The head of third push rod 153 is seated in a recess 154 of member 132. Selective translation of push rod 153, and in turn, member 132, causes cutting blades 71 to operate as guide pins 138 run in slots 139 of support member 130. Slots 139 have a straight portion which causes blades 71 to translate towards stator terminal board 22 in an open condition, and a second inclined portion causing blades 71 to pivot on pins 137. It is the rotational motion imparted by the inclined portions of slo. 139 which causes cutting blades 71 to close upon and cut the lead wire.

Referring once again to FIG. 7, the internal mechanism for driving the wire handling assembly 90 and its associated push rods is described Tube 131 is mounted to the inner races of bearings 161 and 162 for rotation about its longitudinal axis. The outer races of bearings 161 and 162 are affixed to an inner bore 163 of housing 160. Housing 160 is mounted on platform 100 of the three-axis mechanism shown in FIG. 6 by bolts or other suitable means. Tube 131 has an end flange 164 by which tube 131 is fixed to gear 170 by bolts 171. Tube 131 is closed at either end by plates having three bores along respective diameters for seating support bushings 172. Each of push rods 150, 151 and 153 are mounted to slide on bushings 172 to actuate the various components 60, 70 and 80 of the wire handling assembly as described earlier.

Disk 173, which has a circumferential groove 175 on its outer surface and an eccentrically located bore 174, is mounted on the outer surface of central push rod 150 so that it can slide along the exterior of push rod 150. Arm 176 is rigidly connected to piston rod 177 of cylinder 178 via a conventional connection 179, and has a tip 180 engaged in groove 175 of disk 173. Cylinder 178 is mounted on frame 183 which is in turn fixed to platform 100. When actuated, piston rod 177 is guided on bushings 181 and 182 which are seated in bores of frame 183. Disk 173 is rigidly and eccentrically connected to push rod 151, while push rod 153 passes through bore 174. Consequently, when cylinder 178 is actuated, piston rod 177, via the engagement of tip 180 in groove 175 of disk 173, causes disk 173 to slide along push rods 150 and 153 and additionally translates push rod 151. When tube 131 is rotated, tip 180 of arm 176 runs freely in groove 175 of disk 173.

Push rod 153 is eccentrically connected to disk 185, which disk is also slidably mounted on central push rod 150. Disk 185 has a groove 186 in its outer surface that is engaged by tip 187 of arm 188 Arm 188 is connected to piston rod 189 via conventional connection 190. Piston rod 189, which is guided by bushings 191 and 192, is in turn connected to cylinder 193, which cylinder is mounted to frame 183 Actuation of cylinder 193 advances piston rod 189 and disk 185 via tip 187 of arm 189. This causes disk 185 to slide along the exterior of central push rod 150 and advance push rod 153 in a manner similar to that described previously for disk 173.

Finally, push rod 150 is rigidly connected at one end to bell-shaped housing 196. The inner surface of bell-shaped housing 196 is fixed to the outer race of bearing 197, while the inner race of bearing 197 is fixed to piston rod 194 of cylinder 195. This arrangement transmits translational movement of cylinder 195 while permitting rotation of push rod 150 about its longitudinal axis. Rotation is imparted to tube 131 by a controlled DC motor 198 mounted on platform 100, which motor 198 acts through gear train 199 engaged with gear 170. Thus, wire handling assembly 90 can be rotated about the longitudinal axis of central push rod 150 by the operation of motor 198 to impart rotation to tube 131 and to support member 130 attached thereto.

Figure 11:
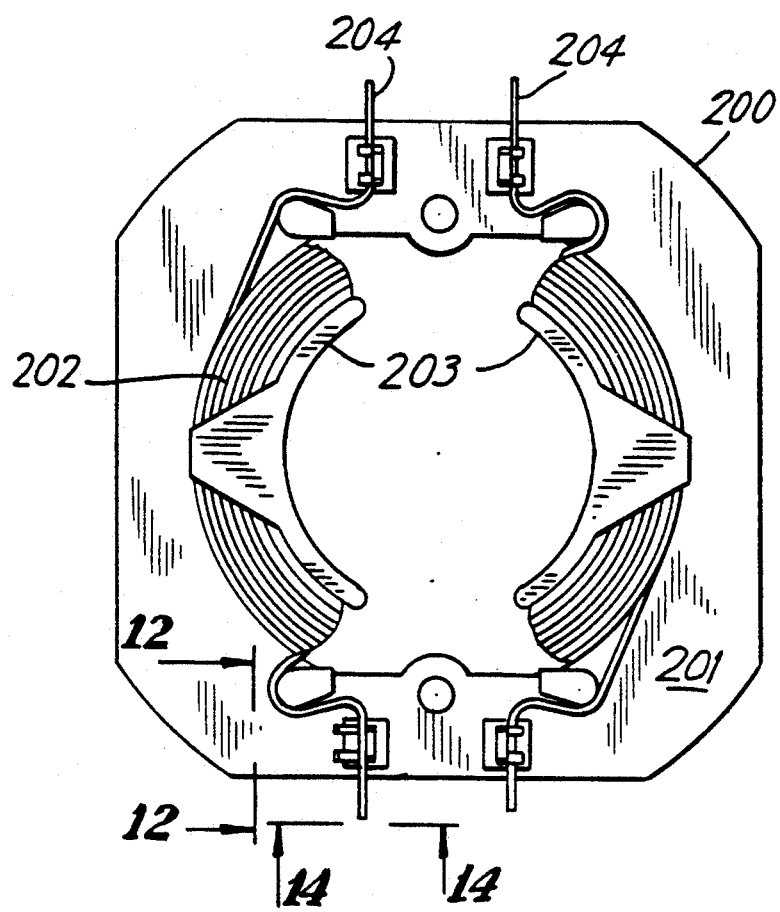
FIG. 11 is an elevation view of a stator core end face illustrating three lead wires engaged to hook-style terminal means in accordance with the present invention. The lead wire on the lower left-hand corner of the stator is shown positioned for engagement using the apparatus of the present invention.

FIGS. 11-15 illustrate a second application of the methods and apparatus of the present invention. FIG. 11 shows stator terminal board 201 of stator core 200 having coils 202 wound on its poles 203. Three of lead wires 204 are routed around insulating protrusions 205 projecting from stator terminal board 201 and engaged in hook-style terminal means 206 mounted on stator terminal board 201. A fourth lead wire 204 is positioned for clamping to terminal means as described below.

As shown in FIG. 12, hook-style terminal means 206 comprises electrically conducting tab 207 seated in electrically insulated housing 208 mounted on, or integrally molded with, stator terminal board 201. Tab 207 has two hook-like fingers 209 projecting from its lateral edges. Hook-like fingers 209 are angled so as to accept wire 204 at the inner base of the hook and are constructed of a flexible metal so as to permit fingers 209 to be clamped against tab 207 to capture wire 204 securely.

Figure 13:
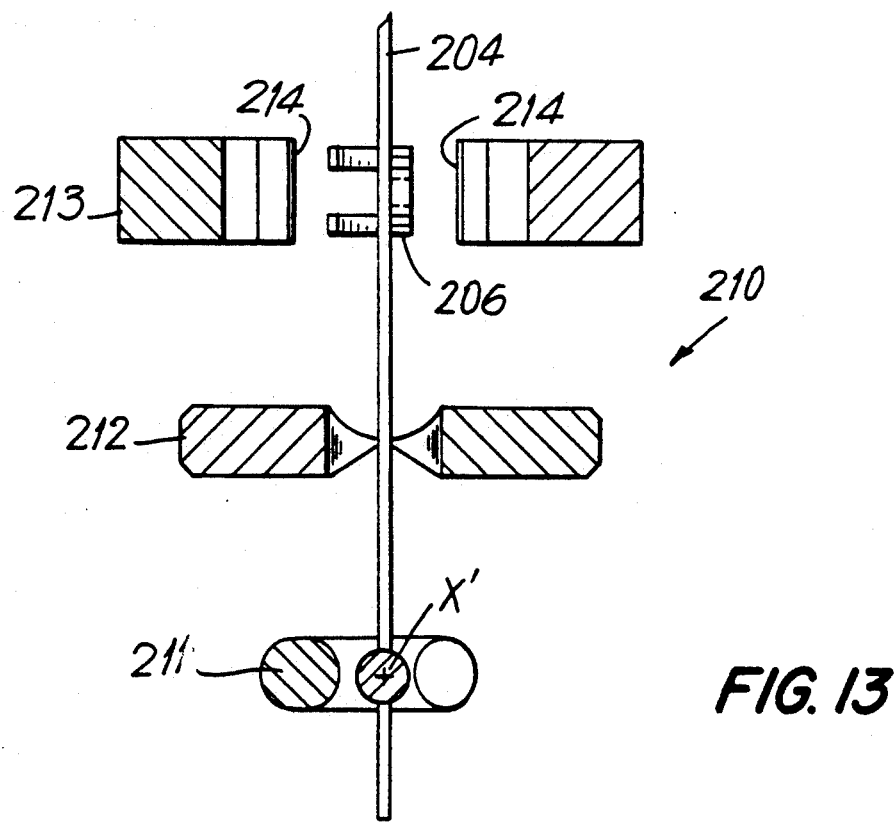
FIG. 13 is a fragmentary end view of an alternate embodiment of the wire handling apparatus of the present invention for engaging lead wires with hook-style terminal means.

An alternate embodiment of the apparatus of the present invention is now described with reference to FIGS. 11-14. FIG. 13 shows wire handling assembly similar to that of wire handling assembly 90 shown and described in FIGS. 3-5. In this embodiment, wire handling assembly 210 comprises wire manipulating device 211, wire cutting device 212, and pair of terminal clamping jaws 213, all of which are aligned along a common axis. Wire cutting device 212 and clamping jaws 213 are capable of rotating about axis X' of wire manipulating device 211 so that lead wire 204 can be correctly oriented with and positioned within terminal means 206.

Wire manipulating device 211 and wire cutting device 212 are similar in design and operation to devices 60 and 70 of wire handling assembly 90 as described heretofore. The apparatus of terminal clamping jaws 213 may be similar in design and operation to wire cutting device 70 as described above, except that the opposing surfaces of clamping jaws 213 have bearing surfaces 214 for clamping hook-like fingers 209 against tab 207. In particular, an embodiment of the type shown in FIGS. 13 and 14 may employ apparatus such as shown in FIGS. 6 and 7, differing in that rod 151 may be arranged to actuate clamping jaws 213 In this case, the sub-assembly for actuating clamping jaws 213 will be similar in design and operation to that for advancing and opening/closing wire cutting device 70 of wire handling assembly 90, as described above.

The method of the present invention comprises the steps of grasping lead wire 204 extending from an auxiliary grippers associated with the pallet carrying the stator core 200 (such as gripper 51 of FIG. 1) with wire manipulating device 211, routing lead wire 204 around insulating protrusion 205 shown in FIG. 11, and then disposing lead wire 204 within the hook-like fingers 209 of terminal means 206. Wire handling assembly 210 is capable of moving through this complex path because of its ability to rotate about the longitudinal axis X' of wire manipulating device 211, as noted above. Translational movement is provided by mounting wire handling assembly 211 on a three-axis platform as described for the wire handling assembly 90.

Once lead wire 204 is disposed within hook-like fingers 209 of terminal means 206, as shown in FIG. 11, clamping jaws 213 are actuated as shown in FIGS. 14A and 14B to clamp hook-like fingers 209 against tab 207, thereby securely engaging wire 204 to terminal means 206. A final step in the lead wire termination process is the operation of wire cutting device 212, which is actuated to sever wire 204 a short distance beyond the point of its engagement with terminal means 206. A lead wire termination to a hook-style terminal means is shown in FIG. 14B. The lead wire connection process is completed at a machine downstream from apparatus 210, which fuses lead wire 204 to ook-like fingers 209 of terminal means 205. It is understood, of course, that the lead wire could be serially engaged with any of a plurality of terminal means located on the stator terminal board, as needed for a particular stator lead wire configuration, prior to severing the lead wire.

Figure 15:
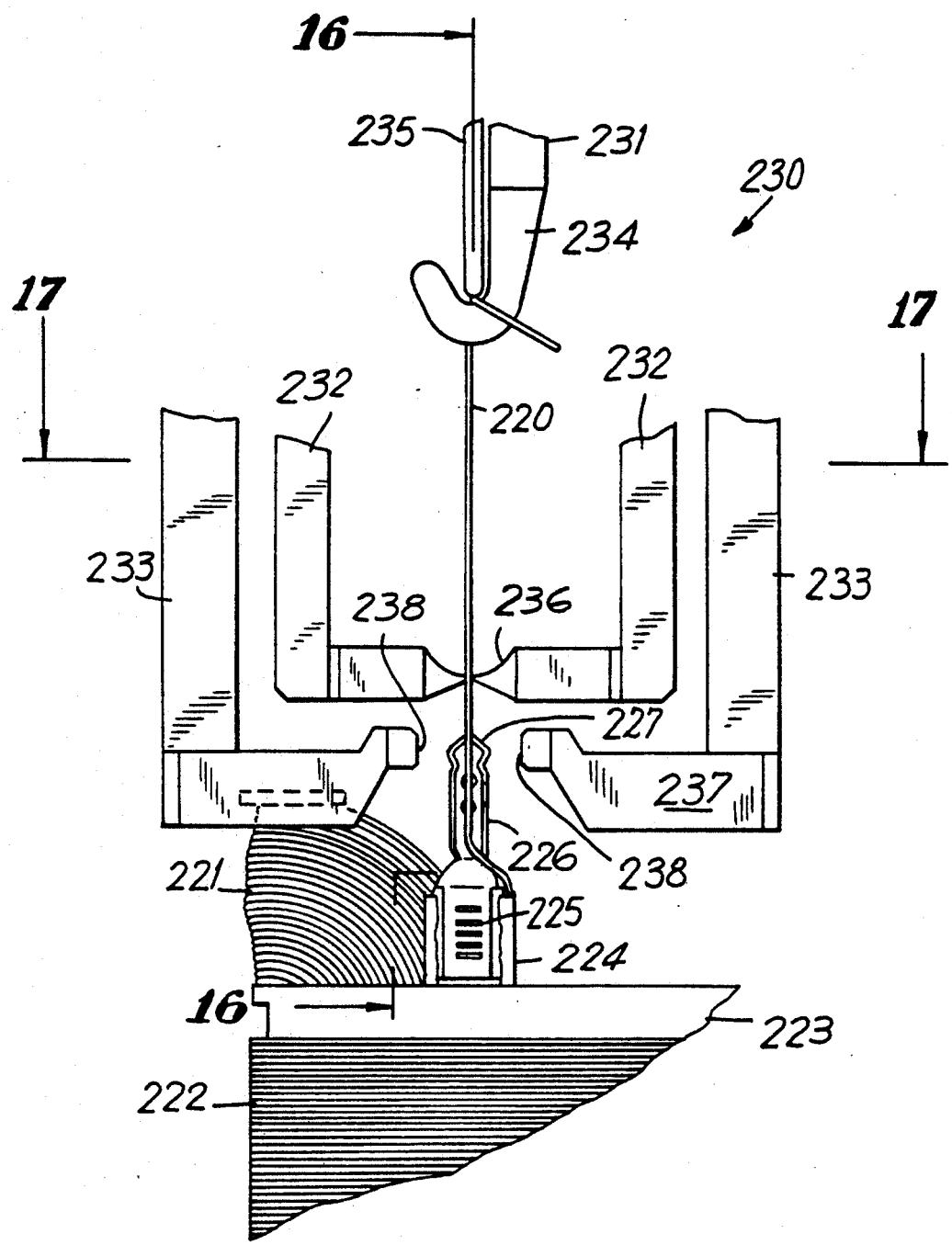
FIG. 15 is a fragmentary plan view of the a another alternate embodiment of the present invention for use with V-shaped terminal means.
Figure 16:
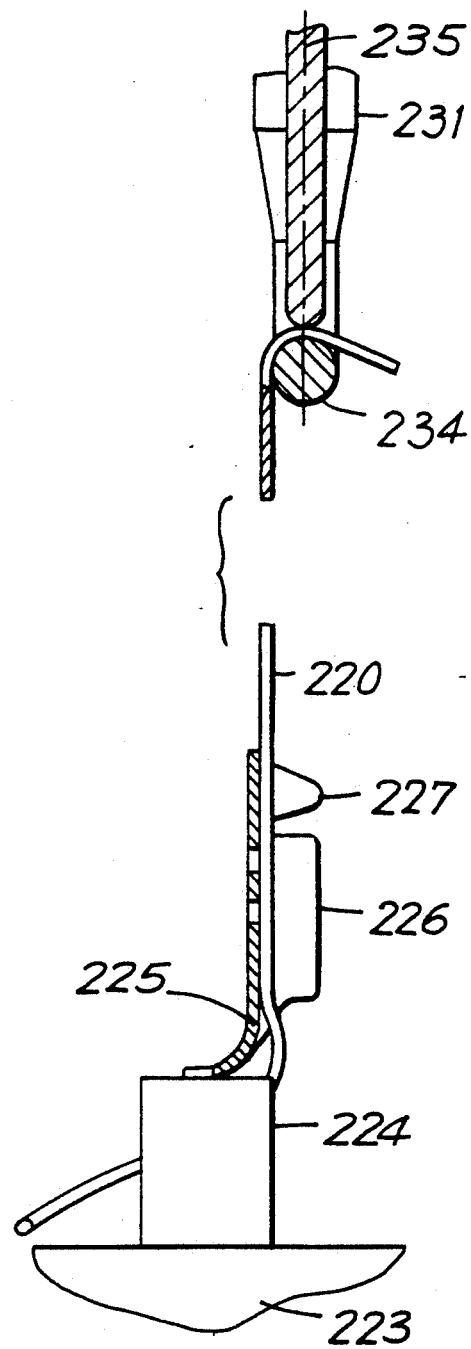
FIG. 16 is a fragmentary elevation view along line 16—16 of FIG. 15.
Figure 17:
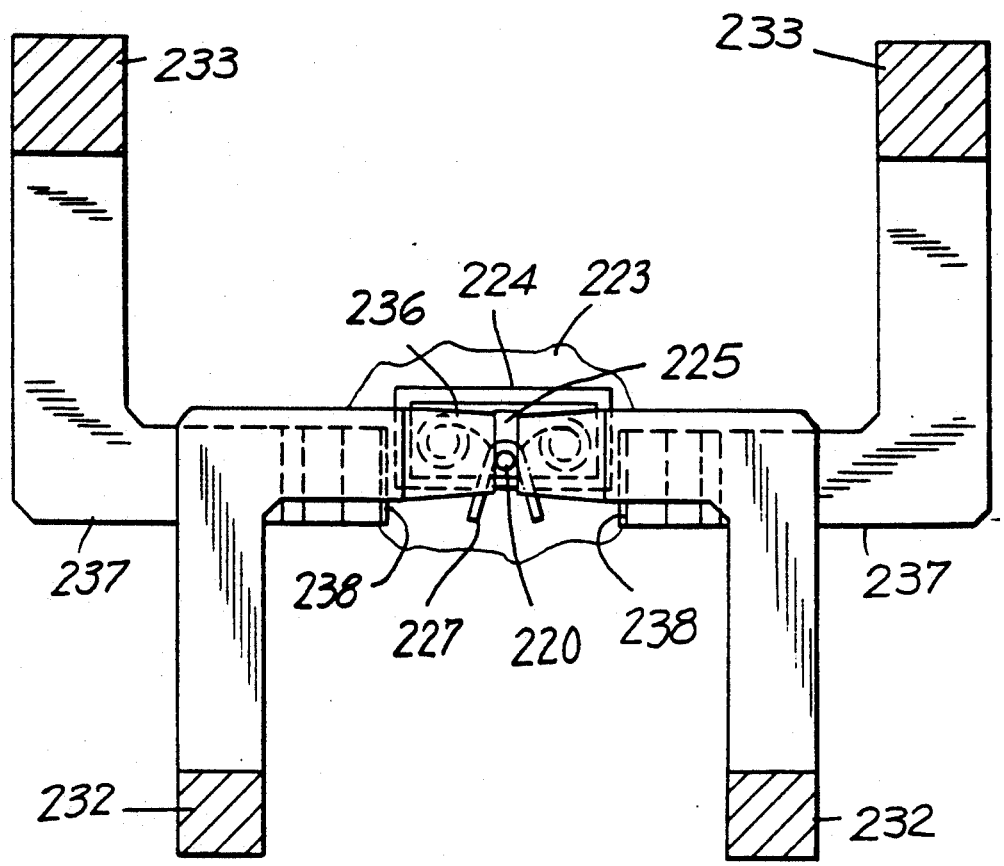
FIG. 17 is a fragmentary elevation view along line 17—17 of FIG. 15.

Yet another embodiment of the present invention is shown in FIGS. 15-17, in this case in the context of engaging a lead wire with a V-shaped terminal means. With reference to FIGS. 15-17, lead wire 220 extends from coil 221 wound on a pole of stator core 222. Stator core 222 has terminal board 223 mounted to its endface. Insulated housing 224 projects from stator terminal board 223. The proximal end of electrically conducting tab 225 is mounted in housing 224. The distal end of tab 225, constructed of flexible metal, has lower and upper opposing wings 226 and 227, respectively, which form a V-shape when viewed in elevation. When viewed in elevation along line 16—16 of FIG. 15, wings 226 and 227 on the far side of terminal means 225 appear as shown in FIG. 16.

Again referring to FIGS. 15-17, wire handling assembly 230 constructed in accordance with the present invention is described. Wire handling assembly 230 comprises wire manipulating device 231, wire cutting device 232, and terminal clamping device 233. Wire manipulating device 231 may be constructed with hook 34 and rod 235 for grasping the lead wire as described heretofore for wire manipulating device 70. Wire cutting device 232 and terminal clamping device 233 may have similar construction and operation, differing only in that blades 236 of cutting device 233 sever wire 220 whereas jaws 237 of terminal clamping device 233 have bearing surfaces 238.

While in the embodiments of the present invention described with reference to FIGS. 3 and 13 the components of wire handling assemblies 90 and 210, respectively, were aligned along an axis parallel to the stator terminal board, wire handling assembly 230 has its component devices 231, 232 and 233 aligned along an axis perpendicular to the stator terminal board, as shown in FIGS. 15 and 16. This alignment is desirable so as to dispose wire 220 near the base of wings 226 of V-shaped tab 225, with a minimum of wire 220 extending from the terminal means. In either configuration of the wire handling assembly, the component devices are aligned substantially perpendicular to the longitudinal axis of the lead wire.

Wire handling assembly 230 differs from assemblies 90 and 210 described above in that wire cutting device 232 and terminal clamping device 233 can be retracted away from the stator terminal board while wire manipulating tool positions lead wire 220 between the wings of terminal means 225. As shown in FIG. 17, the arms supporting cutting blades 236 of cutting device 232 and the arms supporting jaws 237 of terminal clamping device 233 are offset from the plane of terminal means 225. This offset enables devices 232 and 233 to be retracted and advanced into a working position without interfering with each other or wire manipulating device 231, while keeping the respective working elements of the devices (i.e., cutting blades 236 and bearing surfaces 238) aligned substantially along the axis of the lead wire.

The method of the present invention for engaging lead wire 220 with the V-shaped terminal means as shown in FIGS. 15 and 16 is to first grasp Wire 220 from an auxiliary gripper, such as gripper 51 of FIG. 1, with wire manipulating device 231. Through a combination of translational and rotational movements wire 220 is routed against housing 224 and disposed between lower and upper wings 226 and 227, respectively, of the V-shaped distal end of tab 225. Wire manipulating device 231 is then moved perpendicularly away from stator terminal board 223, hook 234 and rod 235 of device 231 yieldably grasping wire 220 so that it slides between hook 234 and rod 235 as device 231 moves away from stator terminal board 223.

Terminal clamping device 233 and wire cutting device 232 are then advanced toward the stator terminal board and positioned between wire manipulating device 231 and terminal means 225. Jaws 237 of terminal clamping device 233 are actuated to bear against upper wings 227 extending from tab 225, causing wings 227 to fold against each other and thereby fully and securely engage wire 220. Wire cutting device 232 is then actuated to sever wire 220 a short distance beyond the distal end of tab 225. It is again to be understood that as for the other previously described embodiments and methods, lead wire 220 could be connected to any one or a series of a plurality of variously located and angularly oriented terminal means mounted on the stator terminal board before the lead wire is severed.

For terminal means such as 225, terminal clamping device 233 folds only the upper wings 227 against lead wire 220 to temporarily engage lead wire 220 with the terminal means. It is typical for such terminal means for lower wings 226 to be crimped against lead wire 220 at a separate crimping machine During this later operation at the crimping machine, upper wings 227 are then broken off.

An unlimited variety of lead wire connection patterns can be achieved, and a wide range of terminal receptacle designs employed, with the methods and several embodiments of the apparatus of the present invention. For example, lead wires for numerous stator terminal configurations can be terminated with an apparatus constructed in accordance with the present invention simply by reprogramming the computer controlling three-axis platform.

What is claimed is:

1. Apparatus for connecting a lead wire extending from a coil portion wound on a stator pole of a stator core to at least one of a plurality of terminal means located on a stator terminal board affixed to said stator core, each one of said plurality of terminal means having a different location and angular orientation on said stator terminal board, said apparatus comprising:
   a. a wire manipulating device for grasping and removing said lead wire from a temporary anchoring gripper, said wire manipulating device having a longitudinal axis;
   b. means for translating and rotating said wire manipulating device about said longitudinal axis to dispose said lead wire along a complex path so that said lead wire is aligned with and partially engaged in any one of said terminal means;
   c. means for fully engaging said lead wire with said terminal means, said means for fully engaging said lead wire comprising a pair of opposing jaws, said opposing jaws having bearing surfaces; and
   d. means for severing said lead wire at a point beyond the engagement of said lead wire with said terminal means, whereby said lead wire is connected to said terminal means.

2. Apparatus for connecting a lead wire extending from a coil portion wound on stator pole of a stator core to a plurality of terminal means located on a stator terminal board affixed to said stator core, each one of said plurality of terminal means having a different location and angular orientation on said stator terminal board, said apparatus comprising:
   a. a wire manipulating device for grasping and removing said lead wire from a temporary anchoring gripper, said wire manipulating device having a longitudinal axis;
   b. means for translating and rotating said wire manipulating device about said longitudinal axis to dispose said lead wire along a complex path so that said lead wire is serially aligned with and partially engaged in any desired order in each one of said plurality of terminal means;
   c. means for fully engaging said lead wire with each one of said plurality of terminal means; said means for fully engaging said lead wire comprising a pair of opposing jaws, said opposing jaws having bearing surfaces; and
   d. means for severing said lead wire at a point beyond the engagement of said lead wire with the last one of said plurality of terminal means, whereby said lead wire is serially connected to said plurality of terminal means.

3. Apparatus for connecting a lead wire extending from a coil portion wound on a stator pole of a stator core to at least one of a plurality of terminal means located on a stator terminal board affixed to said stator core, each one of said plurality of terminal means having a different location and angular orientation on said stator terminal board, said apparatus comprising:
   a. a platform movable in three mutually perpendicular directions relative to said stator core;
   b. a hook means having a longitudinal being capable of rotational movement about said longitudinal axis, so that said hook means is movable along a complex path from a first position where said lead wire is grasped and removed from a temporary anchoring gripper to a spatially remote position where said lead wire is aligned with and partially engaged in any one of said terminal means;
   c. means for fully engaging said lead wire with said terminal means, said means for fully engaging said lead wire comprising a pair of opposing jaws, said opposing jaws having bearing surfaces; and
   d. means for severing said lead wire at a point beyond the engagement of said lead wire with said terminal means.

4. The apparatus of claim 3 wherein said hook means comprises:
   a. a housing having a bore with a longitudinal axis, said housing mounted on said platform;
   b. a support member having a first bore with a longitudinal axis;
   c. means for mounting said support member in said bore of said housing for rotation about said longitudinal axis of said bore;
   d. a hook having a groove, said hook fixedly mounted to said support member so that said groove of said hook lies substantially along said longitudinal axis of said first bore of said support member;
   e. a wire engaging rod slidably disposed in said first bore of said support member; and
   f. means for moving said wire engaging rod from a first position wherein said wire engaging rod is remote from said groove of said hook to a second position wherein said wire engaging rod is adjacent said groove of said hook, so that said wore engaging rod grasps said lead wire against said groove of said hook in said second position.

5. The apparatus of claim 3 wherein said means for severing said lead wire at a point beyond the engagement of said lead wire with said terminal means comprises:
  a. a pair of opposing cutting blades;
  b. means for moving said cutting blades from a first position wherein said cutting blades are remote from one another to a second position wherein said blades contact each other, thereby severing said lead wire when it is disposed between said cutting blades.

6. The apparatus of claim 3 wherein the three devices consisting of said hook means, said means for engaging said lead wire with said terminal means and said means for severing said lead wire at a point beyond the engagement of said wire with said terminal means are arranged substantially along a single plane so that said lead wire lies substantially perpendicular to each of said devices.

7. The apparatus of claim 3 wherein the three devices consisting of said hook means, said means for engaging said lead wire with said terminal means and said means for severing said lead wire at a point beyond the engagement of said lead wire with said terminal means are arranged so that their working elements are aligned substantially along a single plane so that said lead wire lies substantially perpendicular to each of said devices.

8. Apparatus for connecting a lead wire extending from a coil portion wound on a stator pole of a stator core to a plurality of terminal means located on a stator terminal board affixed to said stator core, each one of said plurality of terminal means having a different location and angular orientation on said stator terminal board, said apparatus comprising:
  a. a platform movable in three mutually perpendicular directions relative to said stator core;
  b. a hook means having a longitudinal axis and mounted on said platform, said hook means being capable of rotational movement about said longitudinal axis, so that said hook means is movable along a complex path from a first position where said lead wire is grasped and removed from a temporary anchoring gripper to a series of spatially remote positions where said lead wire is aligned with said serially partially engaged in any desired order in each one of said plurality of terminal means;
  c. a means for fully engaging said lead wire with each one of said plurality of terminal means, said means for fully engaging said lead wire comprising a pair of opposing jaws, said opposing jaws having bearing surfaces; and
  d. means for severing said lead wire at a point beyond the engagement of said lead wire with at least one of said plurality of terminal means.

9. The apparatus of claim 8 wherein said hook means comprisies:
  a. a housing having a bore with a longitudinal axis, said housing mounted on said platform;
  b. a support member having a first bore with a longitudinal axis;
  c. means for mounting said support member in said bore of said housing for rotation about said longitudinal axis of said bore;
  d. a hook having a groove, said hook fixedly mounted to said support member so that said groove of said hook lies substantially along said longitudinal axis of said first bore of said support member;
  e. a wire engaging rod slidably disposed in said first bore of said support member; and
  f. means for moving said wire engaging rod from a first position wherein said wire engaging rod is remote from said groove of said hook to a second position wherein said wire engaging rod is adjacent said groove of said hook, so that said wire engaging rod grasps said lead wire against said groove of said hook is said second position.

10. The apparatus of claim 8 wherein said means for severing said lead wire at a point beyond the engagement of said lead wire with said last one of said plurality of terminal means comprises:
  a. a pair of opposing cutting blades;
  b. means for moving said cutting blades from a first position wherein said cutting blades are remote from one another to a second position wherein said blades contact each other, thereby severing said lead wire when it is disposed between said cutting blades.

11. The apparatus of claim 8 wherein the three devices consisting of said hook means, said means for engaging said lead wire with each one of said plurality of terminal means and said means for severing said lead wire at a point beyond the engagement of said lead wire with said lead one of said plurality of terminal means are arranged substantially along a single plane so that said wire lies substantially perpendicular to each of said devices.

12. The apparatus of claim 8 wherein the three devices consisting of said hook means, said means for engaging said lead wire with each one of said plurality of terminal means and said means for severing said lead wire at a point beyond the engagement of said lead wire with said last one of said plurality of terminal means are arranged so that their working elements are aligned substantially along a single plane so that said lead wire lies substantially perpendicular to each of said devices 13. Apparatus for connecting a lead wire extending from a coil portion wound on a stator pole of a stator core to at least one of a plurality of terminal means located on a stator terminal board affixed to said stator core, each one of said plurality of terminal means having a different location and angular orientation on said stator terminal board, said apparatus comprising:
  a. a hook means having a longitudinal axis and being capable of movement in three mutually perpendicular directions relative to said stator core, said hook means also being capable of rotational movement about said longitudinal axis, so that said hook means is movable along a complex path from a first position where said lead wire is grasped to a spatially remote position where said lead wire is aligned with and partially engaged in any one of said terminal means; and
  b. means for fully engaging said lead wire with said terminal means, said means for fully engaging said lead wire comprising a pair of opposing jaws, said opposing jaws having bearing surfaces.

14. Apparatus for connecting a lead wire extending from a coil portion wound on a stator pole of a stator core to a plurality of terminal means located on a stator terminal board affixed to said stator core, each one of said plurality of terminal means having a different location and angular orientation on said stator terminal board, said apparatus comprising:
  a. a hook means having a longitudinal axis and being capable of movement in three mutually perpendicular directions relative to said stator core, said hook means also being capable of rotational movement about said longitudinal axis, so that said hook means is movable along a complex path from a first position where said lead wire is grasped to a series of spatially remote positions where said lead wire is aligned with and serially partially engaged in any desired order in each one of said plurality of terminal means; and b. a means for fully engaging said lead wire with each one of said plurality of terminal means, said means for fully engaging said lead wire comprising a pair of opposing jaws, said opposing jaws having bearing surfaces.

* * * * *